United States Patent [19]

Himeno et al.

[11] Patent Number: 5,440,024

[45] Date of Patent: Aug. 8, 1995

[54] 3-CYANO-5-NITROTHIOPHENE TYPE MONOAZO DYES AND MIXTURES THEREOF

[75] Inventors: Kiyoshi Himeno, Munakata; Toshio Hihara; Wataru Shimizu, both of Kitakyushu, all of Japan

[73] Assignee: Hoechst Mitsubishi Kasei Co., Ltd., Tokyo, Japan

[21] Appl. No.: 90,311

[22] Filed: Jul. 13, 1993

[30] Foreign Application Priority Data

Jul. 13, 1992 [JP] Japan .................. 4-206950

[51] Int. Cl.⁶ .................. C09B 29/42; C09B 29/36; C09B 29/033; C09B 29/33; D06P 1/118
[52] U.S. Cl. .................. 534/766; 8/512; 8/639; 534/753; 534/773
[58] Field of Search .................. 534/766, 773, 753 M; 8/639, 512

[56] References Cited

U.S. PATENT DOCUMENTS

| | | | |
|---|---|---|---|
| 4,855,413 | 8/1989 | Dehnert et al. | 534/766 |
| 4,952,681 | 8/1990 | Hansen et al. | 534/766 |
| 4,994,564 | 2/1991 | Etzbach et al. | 534/766 |

FOREIGN PATENT DOCUMENTS

| | | | |
|---|---|---|---|
| 0201896 | 11/1986 | European Pat. Off. | 534/766 |
| 0214445 | 3/1987 | European Pat. Off. | 534/766 |
| 0315899 | 5/1989 | European Pat. Off. | 534/766 |
| 0392358 | 10/1990 | European Pat. Off. | 534/766 |
| 0450434 | 10/1991 | European Pat. Off. | 534/766 |
| 0544153 | 6/1993 | European Pat. Off. | 534/766 |
| 0548715 | 6/1993 | European Pat. Off. | 534/766 |
| 2203853 | 5/1974 | France | 534/766 |
| 3528759 | 2/1987 | Germany | 534/766 |

*Primary Examiner*—Floyd D. Higel
*Attorney, Agent, or Firm*—Oblon, Spivak, McClelland, Maier, Neustadt

[57] ABSTRACT

A monoazo disperse dye for dyeing polyester fibers of the following formula (I):

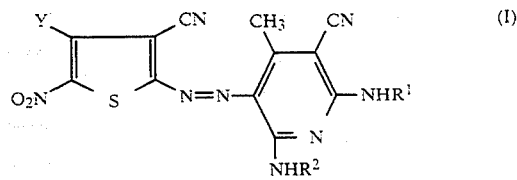

wherein one of $R^1$ and $R^2$ is

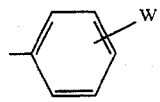

wherein W is hydrogen, halogen, $C_1$-$C_2$ alkyl or alkoxy, the other of $R^1$ and $R^2$ is $C_1$-$C_4$ alkyl, or $C_2$-$C_4$ alkyl substituted by cyano, halogen, hydroxy, hydroxyalkoxy, $C_1$-$C_4$ alkoxy, hydroxyalkoxyalkoxy, acetoxalkoxy, acyloxyalkoxyalkoxy alkoxyalkoxy, alkoxycarbonyloxy or acetoxy, and Y is hydrogen or halogen.

12 Claims, No Drawings

3-CYANO-5-NITROTHIOPHENE TYPE MONOAZO DYES AND MIXTURES THEREOF

The present invention relates to monoazo disperse dyes and mixtures thereof which are excellent particularly in both the light-fastness and the temperature dependency and which are capable of dyeing polyester fibers in excellent blue colors.

As automobile seat material, cloths made of polyester fibers have been commonly employed. In recent years, along with the trend for fashionable automobile interior designs, the colors of automobile seats are desired to be colorful. However, the automobile seats are frequently exposed to direct sunlight at high temperatures in closed compartments, whereby seats are likely undergo color fading, and it is difficult to have beautiful colors maintained for a long period of time. Accordingly, as a dye to be used for dyeing polyester fibers for automobile seats, it is desired to employ the one excellent in both the light fastness and temperature dependency.

However, heretofore, there have been available little dyes which are excellent in both the light-fastness and temperature dependency, and there has been no dye found to be fully satisfactory as a dye for the automobile seats.

For example, Japanese Unexamined Patent Publication No. 266466/1986 and Japanese Examined Patent Publication No. 39347/1986 disclose blue disperse dyes of the formulas (a) and (b) given hereinafter. However, with these disperse dyes, the light-fastness is not yet at a practical level, and the temperature dependency is also inadequate.

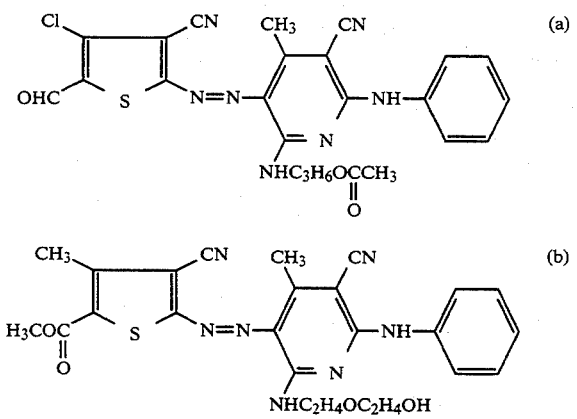

The present invention has been made in view of the above described situation of the prior art, and it is an object of the present invention to provide a disperse dye which is excellent in both the light-fastness and temperature dependency and which is suitable for dyeing polyester fibers for automobile seats.

As a result of extensive studies, the present inventors have found that certain specific blue monoazo disperse dyes or their mixtures are excellent in both the light-fastness and temperature dependency and suitable for dyeing polyester fibers for the interior material of automobiles. The present invention has been accomplished on the basis of this discovery.

Thus, in a first aspect, the present invention provides a monoazo disperse dye of the following formula (I):

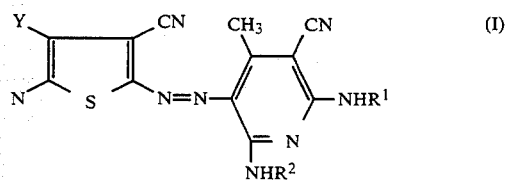

wherein one of $R^1$ and $R^2$ is

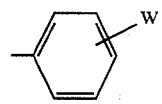

wherein W is hydrogen, halogen, $C_1$-$C_2$ alkyl or alkoxy, the other of $R^1$ and $R^2$ is $C_1$-$C_4$ alkyl, or $C_2$-$C_4$ alkyl substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy, and Y is hydrogen or halogen.

In the second aspect, the present invention provides a disperse dye mixture comprising a monoazo disperse dye of the following formula (I-1) and a monoazo disperse dye of the following formula (I-2) blended thereto in an amount of from 0.1 to 10 parts by weight per part by weight of the monoazo disperse dye of the formula (I-1):

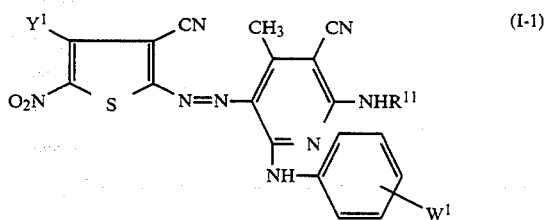

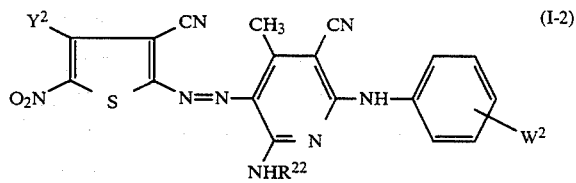

wherein each of $y^1$ and $y^2$ which are independent of each other, is hydrogen or halogen, each of $W^1$ and $W^2$ which are independent of each other, is hydrogen, halogen, $C_1$-$C_2$ alkyl or alkoxy, and each of $R^{11}$ and $R^{22}$ which are independent of each other, is $C_1$-$C_4$ alkyl, or $C_2$-$C_4$ alkyl substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy.

In the third aspect, the present invention provides polyester fibers dyed with the monoazo disperse dye of the above formula (I) or the above disperse dye mixture comprising a monoazo disperse dye of the above formula (I-1) and a monoazo disperse dye of the above formula (I-2).

Now, the present invention will be described in detail with reference to the preferred embodiments.

For each of $R^1$, $R^2$, $R^{11}$ and $R^{22}$ in each of the above formulas (1), (I-1) and (I-2) in the present invention, the alkyl group is $C_1$-$C_4$ alkyl such as methyl, ethyl, linear or branched propyl, or linear or branched butyl; hydroxyl-substituted alkyl may, for example, be hydroxyethyl, hydroxypropyl or hydroxybutyl; hydroxyalkoxy-substituted alkyl may, for example, be hydroxyethoxyethyl, hydroxyethoxypropyl, hydroxyethoxybutyl, hydroxypropoxyethyl, hydroxypropoxypropyl or hydroxybutoxypropyl; and alkoxy-substituted alkyl may, for example, be methoxyethyl, propoxyethyl, butoxyethyl, methoxypropyl, ethoxypropyl, propoxypropyl, butoxypropyl or ethoxybutyl. Further, for each of $R^1$, $R^2$, $R^{11}$ and $R^{22}$, cyano-substituted alkyl may, for example, be cyanomethyl or cyanoethyl; acyloxyalkoxy-substituted alkyl may, for example, be acetoxyethoxyethyl, acetoxyethoxypropyl or propionyloxyethoxyethyl; and alkoxycarbonyloxy-substituted alkyl may, for example, be ethoxycarbonyloxyethyl or propoxycarbonyloxyethyl. Further, alkoxy for each of $R^1$, $R^2$, $R^{11}$ and $R^{22}$ is usually $C_1$-$C_4$ alkoxy. One of $R^1$ and $R^2$ which is not

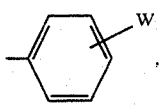

and $R^{11}$ and $R^{22}$ are preferably simultaneously hydroxyalkoxyalkyl or alkoxyalkyl, more preferably simultaneously hydroxyethoxyethyl.

The halogen atom for each of y, $y^1$ and $y^2$ may, for example, be chlorine or bromine, particularly preferably chlorine. Y or each of $y^1$ and $y^2$ which are independent of each other, is preferably hydrogen or chlorine.

In the above formula (I) or in the formulas (I-1) and (I-2), W or each of $W^1$ and $W^2$ which are independent of each other, is hydrogen, halogen, $C_1$-$C_2$ alkyl or alkoxy. This halogen may, for example, be chlorine or bromine. In the above formula (I) or in the formulas (I-1) and (I-2), W or each of $W^1$ and $W^2$ is preferably hydrogen.

The monoazo disperse dye of the above formula (I) of the present invention, can be prepared by coupling a diazo component prepared in accordance with e.g. the method disclosed in Japanese Unexamined Patent Publication No. 212579/1986 with a coupler component prepared in accordance with e.g. the method disclosed in Japanese Examined Patent. Publication No. 39347/1986, by a conventional method.

Specifically, it can be prepared, for example, by diazotizing a compound of the following formula:

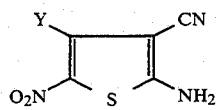

wherein Y is as defined above, by means of a diazotizing agent such as $NOHSO_4$ in a sulfuric acid solvent having a concentration of from 60 to 80 wt % at a temperature of from $-5°$ to $5°$ C., and coupling the diazotized compound with a compound of the following formula:

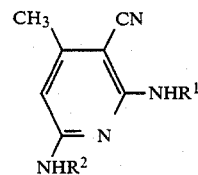

wherein $R^1$ and $R^2$ are defined above, at a temperature of from $-5°$ to $5°$ C.

It is also effective to use two or more dyes of the above formula (I) in combination as a mixture. In the present invention, it is preferred to mix a monoazo disperse dye of the above formula (I-1) and a monoazo disperse dye of the above formula (I-2) in such a ratio that the latter is from 0.1 to 10 parts by weight per part by weight of the former, since the temperature dependency is thereby improved. Particularly preferred is a mixture in which the latter is in an amount of from 0.3 to 4 parts by weight per part by weight of the former In such a case, $W^1$ and $R^{11}$ in the formula (I-2), may be different from $W^2$ and $R^{22}$ in the formula (I-2), respectively. Preferably, however, they are the same.

The above disperse dye mixture may be prepared by mixing the monoazo disperse dye of the above formula (I-1) and the monoazo disperse dye of the above formula (I-2). Otherwise, it may be prepared by mixing two or more coupler components at the time of synthesizing the respective dyes, followed by coupling the mixture with the diazo components.

Fibers which can be dyed by the monoazo disperse dye or by the disperse dye mixture of the present invention, may, for example, be polyester fibers made of e.g. polyethylene terephthalate or a polymer of terephthalic acid with 1,4-bis(hydroxymethyl)cyclohexane, or blended yarn products or combined filament yarn products of such polyester fibers with natural fibers such as cotton, silk or wool. As blue polyester fibers for automobile seats, it is especially preferred to use polyester fibers of from 2 to 5 deniers, and to obtain fine denier polyester cloths for clothings, polyester fibers of from 0.1 to 1 denier are preferred.

The monoazo disperse dye and the disperse dye mixture of the present invention are insoluble or hardly soluble in water. Accordingly, to dye the polyester fibers with them, a dye bath or a printing paste is prepared by dispersing them in an aqueous medium by using a dispersing agent such as a condensation product of naphthalene sulfonic acid with formaldehyde, a higher alcohol sulfuric acid ester or a higher alkylbenzene sulfonate, followed by dip dyeing or textile printing in accordance with a conventional method.

For example, in the case of dip dyeing, a conventional dyeing treatment such as a high temperature dyeing method, a carrier dyeing method or a thermosol dyeing method, may be applied, whereby polyester fibers, blended yarn products or combined filament yarn products thereof can be dyed with excellent fastness. In such a case, a conventional acidic substance such as formic acid, acetic acid, phosphoric acid or ammonium sulfate may be added to the dye bath, as the case requires, whereby better results may be obtained. The pH of the dye bath is usually preferably adjusted within a range of from 5.0 to 9.0. The dyeing temperature may, for example, be set at a level of from $120°$ to $140°$ C. Further, various leveling agents and/or ultraviolet absorbers may be used in combination.

Further, in the present invention, when the above monoazo disperse dye or the disperse dye mixture is used, it is also possible to incorporate not more than about 10 wt % of a red component, a yellow component and/or other blue component to obtain a desired color. As such a yellow component, C.I. Disperse Yellow 42, 86 or 71 may, for example, be mentioned; as the red component, C.I. Disperse Red 91, 191, 279 or 302 may, for example, be mentioned; and as the blue component, C.I. Disperse Blue 56, 54, 27, 77 or 60 may, for example, be mentioned.

The monoazo disperse dye of the formula (I) of the present invention exhibits particularly good light fastness. Further, a disperse dye mixture comprising monoazo disperse dyes of the formulas (I-1) and (I-2) is capable of improving the temperature dependency to a large extent while maintaining the good light fastness.

Now, the present invention will be described in further detail with reference to Examples. However, it should be understood that the present invention is by no means restricted by such specific Examples.

EXAMPLES 1 and 2 and COMPARATIVE EXAMPLES 1 and 2

1 g of a monoazo disperse dye as identified in the following Table 1 or a blue disperse dye of the following formula (a) or (b) was dispersed in 2 l of water containing 1 g of a naphthalene sulfonic acid-formaldehyde condensation product and 2 g of a higher alcohol sulfuric acid ester. Further, 2 g of a ultraviolet absorber (Sunlife LP-100, trade name, manufactured by Nikka Kagaku K.K.) was added thereto. The obtained dye bath was adjusted to pH 5.5. Then, 100 g of polyester fibers were dipped therein, and exhaustion dyeing was conducted at 130° C. for one hour, followed by soaping, washing with water and drying to obtain a blue dyed cloth.

With respect to the dyed cloth, the super light fastness and the temperature dependency were evaluated, as follows.

Measurement of super light fastness

The light fastness of the above dyed cloth was measured by a testing method based on the testing method prescribed in JIS (JIS L-0843) and modified for automobiles (the temperature was set at a level of 89°±5° C., a soft polyurethane foam (10 mm) was bonded to the rear side of the test cloth, and the light fastness was evaluated by the discoloration scale prescribed by JIS).

Measurement of the temperature dependency

With respect to the dyed cloth obtained by dyeing at 130° C. for 60 minutes, the dye tinted to the cloth was dissolved and extracted with a 0.1% phosphoric acid solution in dimethylformamide and subjected to calorimetry, and the tinted dye density thereby obtained was used as a standard (100). Further, with respect to a cloth dyed under the same dyeing conditions as described above except that the dyeing temperature was changed to 120° C., the tinted dye density was obtained in the same manner, whereupon the temperature dependency was determined from such tinted dye densities in accordance with the following formula.

Temperature dependency (%) = (Tinted dye density when dyed at 120° C. for 60 minutes/Tinted dye density when dyed at 130° C. for 60 minutes) × 100

The results are shown in Table 1.

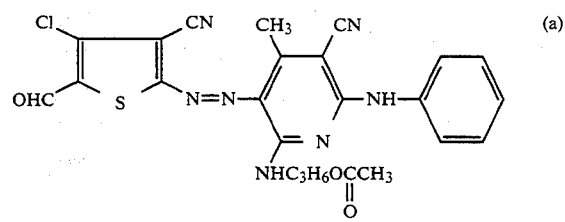

(a)

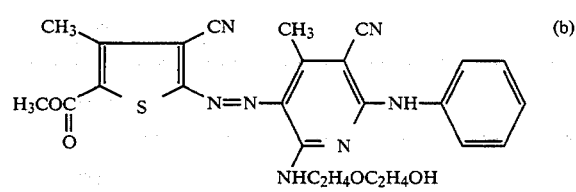

(b)

Further, the dye of Example 1 was prepared by the following method.

1.4 mols of NOHSO$_4$ was added to 70 wt % sulfuric acid. While maintaining the temperature at a level of −2°±2° C., 1 mol of

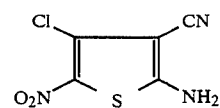

was added thereto over a period of one hour. The mixture was further stirred at −2°±2° C. for one hour to obtain a diazotized solution.

Then, in methanol, 1 mol of

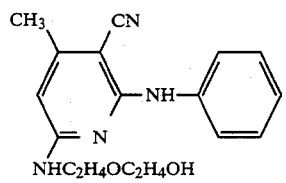

and 0.5 mol of urea were added. While maintaining the temperature at −2°±2° C., the above diazotized solution was added thereto over a period of one hour. The mixture was further stirred at −2°±2° C. for one hour.

After the reaction, the product was collected by filtration and washed with water.

TABLE 1

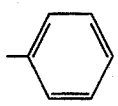

|  | Y | R¹ | R² | $\lambda_{max}$ (nm) in acetone | Color of dyed cloth | Super light fastness (grade) | Temp. dependency (%) |
|---|---|---|---|---|---|---|---|
| Example 1 | Cl | —C₆H₅ (phenyl) | —C₂H₄OC₂H₄OH | 590 | Blue | 4–5⁺ | 35 |
| Example 2 | Cl | —C₂H₄OC₂H₄OH | —C₆H₅ (phenyl) | 590 | Blue | 4–5⁺ | 25 |
| Comparative Example 1 | | Dye of the formula (a) (as disclosed in Japanese Unexamined Patent Publication No. 266466/1986) | | 572 | Reddish blue | 3–4 | 30 |
| Comparative Example 2 | | Dye of the formula (b) (as disclosed in Japanese Examined Patent Publication No. 39347/1986) | | 541 | Reddish purple | 3 | 30 |

EXAMPLES 3 to 23

Using monoazo disperse dyes as identified in the following Table 2, dyed cloths were obtained in the same manner as in Example 1. These cloths all had super light fastness of grade 4 to 5. Thus, good results were obtained.

TABLE 2

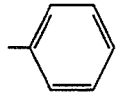

|  | Y | R¹ | R² | $\lambda_{max}$ (nm) in acetone | Color of dyed cloth |
|---|---|---|---|---|---|
| Example 3 | H | —C₆H₅ (phenyl) | —C₂H₄OC₂H₄OH | 580 | Blue |
| Example 4 | H | —C₂H₄OC₂H₄OH | —C₆H₅ (phenyl) | 580 | Blue |
| Example 5 | Cl | —C₆H₅ (phenyl) | —CH₃ | 581 | Blue |
| Example 6 | Br | —C₆H₅ (phenyl) | —C₂H₄OH | 589 | Blue |
| Example 7 | Cl | —C₆H₅ (phenyl) | —C₂H₄OCH₃ | 590 | Blue |

TABLE 2-continued

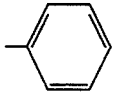

| | Y | R¹ | R² | $\lambda_{max}$ (nm) in acetone | Color of dyed cloth |
|---|---|---|---|---|---|
| Example 8 | Cl | phenyl | —$C_3H_6OC_4H_9$ | 581 | Blue |
| Example 9 | Cl | phenyl | —$C_3H_6OC_3H_6OH$ | 591 | Blue |
| Example 10 | H | —$C_3H_6OC_3H_7(i)$ | phenyl | 579 | Blue |
| Example 11 | H | phenyl | —$C_2H_4OC_2H_4OCCH_3$ ‖ O | 579 | Blue |
| Example 12 | H | phenyl | —$CH_2CN$ | 578 | Blue |
| Example 13 | H | phenyl | —$C_2H_4CN$ | 581 | Blue |
| Example 14 | H | phenyl | —$C_2H_4OCOC_2H_5$ ‖ O | 578 | Blue |
| Example 15 | H | phenyl | —$C_3H_6OCH_3$ | 590 | Blue |
| Example 16 | H | phenyl | —$C_3H_6OCCH_3$ ‖ O | 588 | Blue |
| Example 17 | H | 4-Cl-phenyl | —$C_3H_6OC_3H_6OH$ | 572 | Blue |
| Example 18 | H | 3-CH₃-phenyl | —$C_3H_6OC_2H_5$ | 586 | Blue |

TABLE 2-continued $$\text{structure: } Y\text{-, }O_2N\text{- on thiophene-S-ring with CN, linked via }N=N\text{ to pyridine ring with }CH_3\text{, }CN\text{, }NHR^1\text{, and }=N-\text{ to }NHR^2$$

| | Y | R$^1$ | R$^2$ | λ$_{max}$ (nm) in acetone | Color of dyed cloth |
|---|---|---|---|---|---|
| Example 19 | Cl | (3-methoxyphenyl) | —C$_2$H$_4$OC$_2$H$_4$OH | 618 | Blue |
| Example 20 | H | (phenyl) | —C$_2$H$_4$Cl | 571 | Blue |
| Example 21 | H | (phenyl) | —C$_2$H$_4$OC$_2$H$_4$OC$_2$H$_4$OH | 580 | Blue |
| Example 22 | H | (phenyl) | —C$_2$H$_4$OC$_2$H$_4$OC$_2$H$_4$OCCH$_3$ (with C=O) | 580 | Blue |
| Example 23 | H | (phenyl) | —C$_2$H$_4$OC$_2$H$_4$OC$_2$H$_5$ | 580 | Blue |

EXAMPLES 24 to 27

Using dye mixtures as identified in the following Table 3, dyed cloths were obtained in the same manner as in Example 1. With respect to these dyed cloths, evaluation was conducted in the same manner as in Example 1. The results are shown in the following Table 3.

EXAMPLES 28 to 31

Using dye mixtures as identified in the following Table 4, dyed cloths were obtained in the same manner as in Example 1. With respect to these dyed cloths, evaluation was conducted in the same-manner as in Example 1. The results are shown in the following Table 4.

TABLE 3

| | Dyes used | λ$_{max}$ (nm) in acetone | Color of dyed cloth | Super light fastness (grade) | Temp. dependency (%) |
|---|---|---|---|---|---|
| Example 24 | Dye of Example 1: 0.5 g<br>Dye of Example 2: 0.5 g | 590 | Blue | 4–5+ | 60 |
| Example 25 | Dye of Example 1: 0.7 g<br>Dye of Example 2: 0.3 g | 590 | Blue | 4–5+ | 72 |
| Example 26 | Dye of Example 3: 0.5 g<br>Dye of Example 4: 0.5 g | 580 | Blue | 4–5 | 65 |
| Example 27 | Dye of Example 3: 0.65 g<br>Dye of Example 4: 0.35 g | 580 | Blue | 4–5 | 75 |

TABLE 4

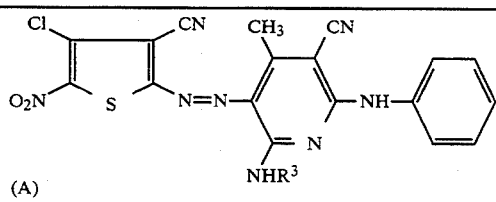

(A)

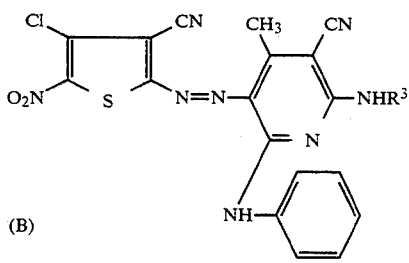

(B)

| | Dyes used | $R^3$ | Color of dyed cloth | Super light fastness (grade) | Temp. dependency (%) |
|---|---|---|---|---|---|
| Example 28 | Dye of the formula (A): 0.8 g<br>Dye of the formula (B): 0.2 g | —$C_3H_6OC_2H_4OH$ | Blue | 4–5+ | 70 |
| Example 29 | Dye of the formula (A): 0.7 g<br>Dye of the formula (B): 0.3 g | —$C_4H_8OC_2H_5$ | Blue | 4–5+ | 65 |
| Example 30 | Dye of the formula (A): 0.6 g<br>Dye of the formula (B): 0.4 g | —$C_2H_4OCH_3$ | Blue | 4–5+ | 60 |
| Example 31 | Dye of the formula (A): 0.5 g<br>Dye of the formula (B): 0.5 g | —$C_2H_4OC_4H_9$ | Blue | 4–5+ | 63 |

EXAMPLE 32

To 60 g of a disperse dye mixture comprising 25 parts by weight of a monoazo disperse dye of the following formula:

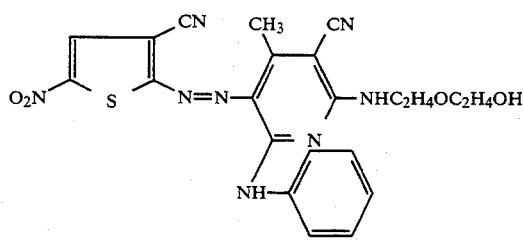

and 75 parts by weight of a monoazo disperse dye of the following formula:

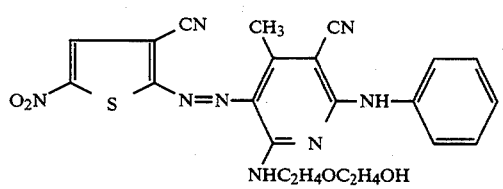

140 g of a lignin sulfonic acid-formaldehyde condensation product and 650 g of water were mixed, and the mixture was wet-pulverized by a sand grinder, followed by spray drying. To 0.19 of the obtained powdery disperse dye mixture, 150 ml of water was added to obtain a dye bath. This dye bath was adjusted to pH 7. Then, 5 9 of a fine denier polyester cloth (yarn size: 0.5 denier) was dipped therein, and exhaustion dyeing was conducted at 135° C. for 60 minutes, followed by reduction cleaning, washing with water and drying in accordance with conventional methods to obtain a dyed cloth having a blue color. The light fastness of this dyed cloth was grade 5 (JIS-L0843 method, 40 hr).

We claim:

1. A monoazo disperse dye of the following formula (I):

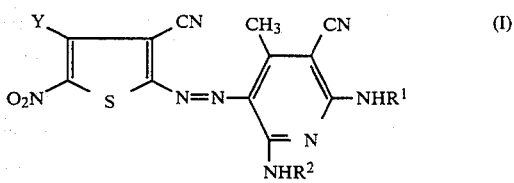 (I)

wherein one of $R^1$ and $R^2$ is

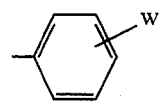

wherein W is hydrogen, halogen, $C_1$-$C_2$ alkyl or alkoxy, the other of $R^1$ and $R^2$ is $C_1$-$C_4$ alkyl, or $C_2$-$C_4$ alkyl substituted by cyano, halogen, hydroxy, hydroxyalkoxy, $C_1$-$C_4$ alkoxy, hydroxyalkoxyalkoxy, acetoxyalkoxy, acetoxyalkoxyalkoxy, alkoxyalkoxy, alkoxycarbonyloxy or acetoxy and Y is hydrogen or halogen.

2. The disperse dye according to claim 1, wherein W is hydrogen.

3. The disperse dye according to claim 1, wherein Y is hydrogen or chlorine.

4. The disperse dye according to claim 1, wherein the other of $R^1$ and $R^2$ is hydroxyalkoxyalkyl or alkoxyalkyl.

5. The disperse dye according to claim 1, wherein the other of $R^1$ and $R^2$ is hydroxyethoxyethyl.

6. A disperse dye mixture comprising a monoazo disperse dye of the following formula (I-1) and a monoazo disperse dye of the following formula (I-2) blended thereto in an amount of from 0.1 to 10 parts by weight per part by weight of the monoazo disperse dye of the formula (I-1):

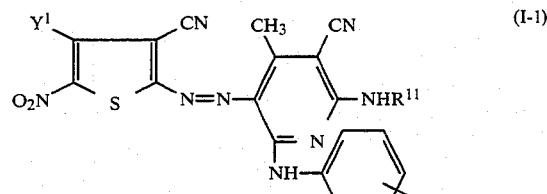

(I-1)

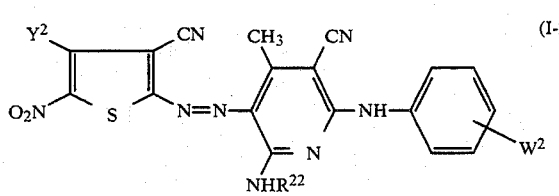

(I-2)

wherein each of $Y^1$ and $Y^2$ which are independent of each other, is hydrogen or halogen, each of $W^1$ and $W^2$ which are independent of each other, is hydrogen, halogen, $C_1$–$C_2$ alkyl or alkoxy, and each of $R^{11}$ and $R^{22}$ which are independent of each other, is $C_1$–$C_4$ alkyl, or $C_2$–$C_4$ alkyl substituted by cyano, halogen, hydroxy, hydroxyalkoxy, $C_1$–$C_4$ alkoxy, hydroxyalkoxyalkoxy, acetoxyalkoxy, acetoxyalkoxyalkoxy, alkoxyalkoxy, alkoxycarbonyloxy or acetoxy.

7. The disperse dye mixture according to claim 6, wherein $W^1$ and $W^2$ are Simultaneously hydrogen.

8. The disperse dye mixture according to claim 6, wherein $y^1$ and $y^2$ are hydrogen or chlorine.

9. The disperse dye mixture according to claim 6, wherein $R^{11}$ and $R^{22}$ are simultaneously hydroxyalkoxyalkyl or alkoxyalkyl.

10. The disperse dye mixture according to claim 6, wherein $R^{11}$ and $R^{22}$ are simultaneously hydroxyethoxyethyl.

11. The disperse dye mixture according to claim 6, wherein the monoazo dye of the formula (I-2) is in an amount of from 0.3 to 4 parts by weight per part by weight of the monoazo dye of the formula (I-1).

12. Polyester fiber dyed with a monoazo dye of any one of claims 1 to 5 or a disperse dye mixture of any one of claims 6 to 11.

* * * * *